United States Patent [19]

Wada

[11] 4,452,089

[45] Jun. 5, 1984

[54] KÁRMÁN'S VORTEX STREET CURRENT METER

[75] Inventor: Shunichi Wada, Himeji, Japan

[73] Assignee: Mitsubishi Denki Kabushiki Kaisha, Tokyo, Japan

[21] Appl. No.: 382,791

[22] Filed: May 27, 1982

Related U.S. Application Data

[63] Continuation-in-part of Ser. No. 224,508, filed as PCT JP 80/00094, May 2, 1980, published as WO 81/01877, Jul. 9, 1981, § 102(e), Dec. 9, 1980, abandoned.

[30] Foreign Application Priority Data

Dec. 29, 1979 [JP] Japan .................................. 54-172736

[51] Int. Cl.³ .............................................. G01F 1/32
[52] U.S. Cl. .................................. 73/861.23; 73/118.2
[58] Field of Search ............ 73/861.23, 861.22, 118 A; 123/494

[56] References Cited

U.S. PATENT DOCUMENTS 3,956,928 5/1976 Barrera ........................... 73/861.23

FOREIGN PATENT DOCUMENTS 54-107362 8/1979 Japan .................................. 73/861.23

Primary Examiner—Herbert Goldstein
Attorney, Agent, or Firm—Wenderoth, Lind & Ponack

[57] ABSTRACT

A Kármán's vortex street current meter has a conduit having a vortex generating strut extending horizontally thereacross substantially perpendicular to the direction of flow of a stream of fluid through the conduit; a part upstream of the strut in which convection can take place for causing the less dense portion of the fluid flowing in the conduit to rise and flow along the upper part of the conduit and the more dense portion to flow along the lower part of the conduit; and a vortex detector downstream of the strut and including an ultrasonic transmitter at the upper part of the conduit for propagating an ultrasonic wave across the Kármán's vortex street generated downstream of the generating strut, and an ultrasonic receiver positioned oppositely to the transmitter on the lower side of the conduit.

5 Claims, 4 Drawing Figures

KÁRMÁN'S VORTEX STREET CURRENT METER

This application is a continuation-in-part of application Ser. No. 224,508, filed Dec. 9, 1980, now abandoned.

TECHNICAL FIELD

This invention relates to a Kármán's vortex street current meter for measuring a flow speed or a flow rate by disposing a vortex generating strut in a fluid to be measured flowing through a conduit, and detecting the number of Kármán's vortices (the frequency of generation of vortices) generated downstream thereof with an ultrasonic wave.

BACKGROUND ART

Japanese utility model publication No. 17010/1973 has proposed a method of measuring the flow speed or the flow rate of a fluid flowing through a conduit by disposing a vortex generating strut within the conduit and detecting the frequency of generation of Kármán's vortices generated downstream thereof with an ultrasonic wave. With a Kármán's vortex street detected by this method, an ultrasonic wave transmitted from an ultrasonic transmitter propagates through the fluid, is modulated with the Kármán's vortex street and received by a receiver. However when the fluid has a low flow speed, the Kármán's vortex street is weak and accordingly the degree of modulation undergone by propagated ultrasonic wave is small. Therefore it is difficult to detect the Kármán's vortex street at low flow speeds. Further in the detection of the flow speed of fluids having changes in temperature occurring frequently therein resulting in an uneven temperature such as the air sucked into the carburetors of motor vehicles, the ultrasonic wave being propagated through the fluid is subjected, in addition to the modulation by the Kármán's vortex street, to modulation due to a difference in sound velocity caused by the unevenness of the temperature. The modulation due to this unevenness of the temperature may make it difficult to detect the Kármán's vortex street.

DISCLOSURE OF THE INVENTION

The present invention provides a Kármán's vortex street current meter having an ultrasonic transmitter disposed to propagate an ultrasonic wave across a stream with a Kármán's vortex street generated therein downstream of a vortex generating strut and an ultrasonic receiver for receiving the ultrasonic wave modulated with the Kármán's vortex street, disposed to the transmitter and with the ultrasonic transmitter on the upper side relative to the ultrasonic receiver. According to the present invention, a fluid flowing above and below the vortex generating strut has developed therebetween a temperature difference ultilizing the action of convection caused from an uneven temperature of the fluid or a density difference caused by mixing it with a dissimilar fluid having a different density. By installing the ultrasonic transmitter on the upper side at which the fluid is higher in temperature (or lower in density) and the ultrasonic receiver on the lower side having the lower temperature (or higher density), by a change in the propagation velocity of the ultrasonic wave between the Kármán's vortices generated in the upper and lower fluids, there is exhibited the effect that the frequency of generation of the Kármán's vortices can be easily detected.

BEST MODE OF CARRYING OUT THE INVENTION

Figure 1:
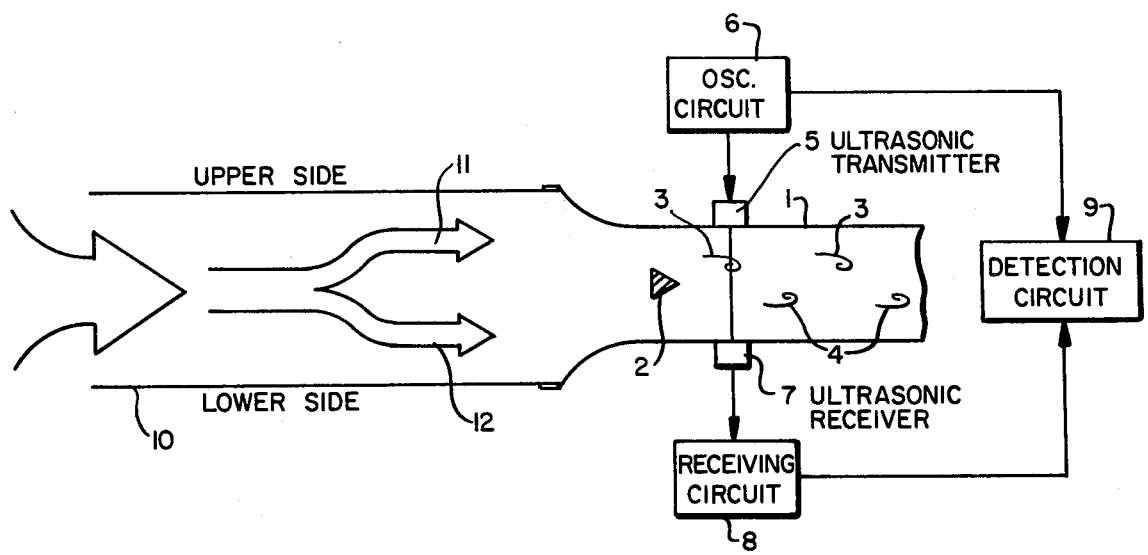
FIG. 1 is a schematic view illustrating one embodiment of the present invention.

In the Figures, a conduit 1 is provided through which the fluid to be measured flows, and a vortex generating strut 2 is disposed substantially perpendicular to the stream of said fluid and also extending horizontally which produces vortices 3 and 4 of a Kármán's vortex street. An ultrasonic transmitter 5 is disposed on the upper portion of said conduit 1, driven by oscillation circuit 6, and an ultrasonic receiver is disposed on the lower portion of said conduit opposite to said transmitter 5, which supplies a signal to a receiving circuit 8 which in turn is connected to a detection circuit 9. An ultrasonic vortex detector device is constituted by said ultrasonic transmitter 5, oscillation circuit 6, ultrasonic receiver 7, receiving circuit 8 and detection circuit 9. A conduit 10 is a fluid intake port which serves to cause a convection in an incoming fluid. The incoming fluid separates in the conduit 10 into a warm fluid 11 flowing on the upper side and a cold fluid 12 on the lower side.

In the construction as described above, when the fluid to be measured (e.g. air) from the intake port flows in the direction of the arrow through the interior of the conduit 1, the strut 2 generates Kármán's vortices 3 and 4. The ultrasonic transmitter 5 is driven by the oscillation circuit 6 to transmit an ultrasonic wave to the receiver 7. At that time, the ultrasonic wave is modulated by said Kármán's vortices while the same propagates through the flowing fluid. The modulated ultrasonic wave is received by the receiver 7 and amplified by the receiving circuit 8.

The modulation undergone by the ultrasonic wave is an amplitude modulation, a frequency modulation, a phase modulation or the like and the frequency of generation of said Kármán's vortices is detected by the detection circuit 9 for demodulating the received ultrasonic wave.

When unevenness of temperature does not occur in the drawn in fluid or where a temperature difference is not developed between the conduits 10 and 1 and the measured fluid, a temperature difference does not exist between the fluid flowing on the upper side of the vortex generating strut 2 and that flowing on the lower side thereof and the modulation undergone by the ultrasonic wave is in a direction in which the sound velocity is accelerated by the upper vortices 3 and a direction in which the sound velocity is decelerated by the lower vortices 4.

Subsequently where an unevenness of the temperature exists in the fluid or where a temperature difference exists between the fluid and the conduit 10 or 1, the warm part of the fluid is caused to flow on the upper side by means of the action of convection while the fluid is traveling within the conduit 10 having a predetermined length. This results in the warm part of the fluid flowing principally on the upper side of the vortex generating strut 2 and the cold part of the fluid flowing on the lower side thereof in a laminar flow. When a temperature difference exists between the parts of the fluid above and below the vortex generating strut 2 in this manner, the warm part of the fluid flowing on the upper side has Kármán's vortices 3 generated on the upper side while the cold part of the fluid flowing on the lower side has Kármán's vortices 4 generated on the lower side according to the fundamental principles of generation of a Kármán's vortex street. If a temperature difference exists between the clockwise and counter-clockwise Kármán's vortices 3 and 4, respectively, in this way then the propagation velocity of said ultrasonic wave propagated through said Kármán's vortices 3 and 4 has a propagation velocity further added to the modulated component caused by the temperature difference as compared with the abovementioned case in which no temperature difference exists. Therefore a stronger vortex signal will be detected.

Whereas the vortex signal is normally disturbed by the modulation resulting from the unevenness of the temperature, the present invention produces the effect that the vortex signal can be reversely augmented by installing the ultrasonic transmitter 5 on the upper side and the receiver 7 on the lower side.

Figure 2:
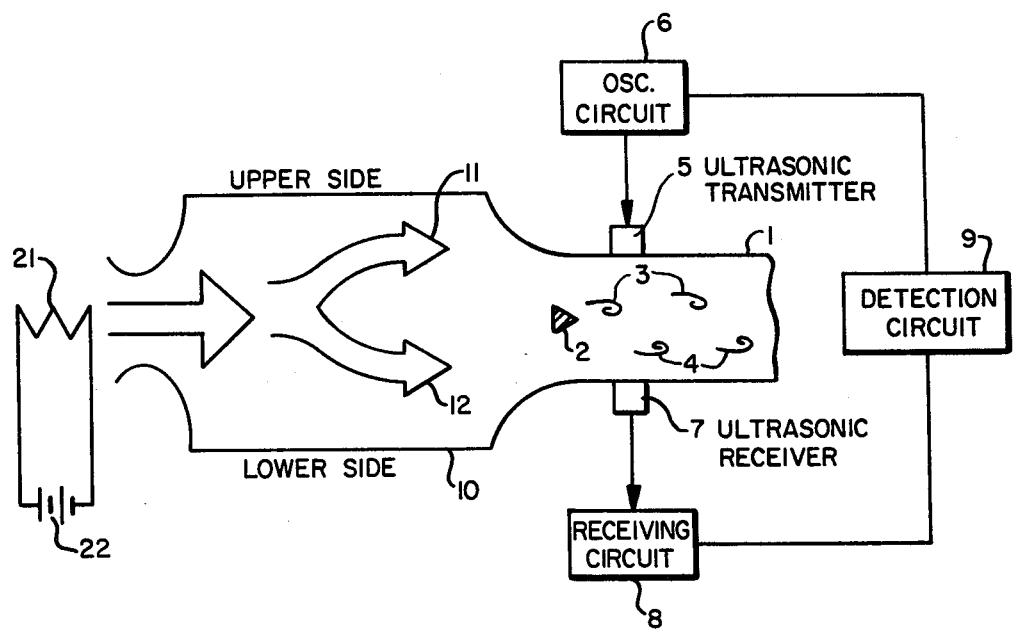
FIGS. 2, 3 and 4 are views illustrating different embodiments of the present invention, respectively.
Figure 4:
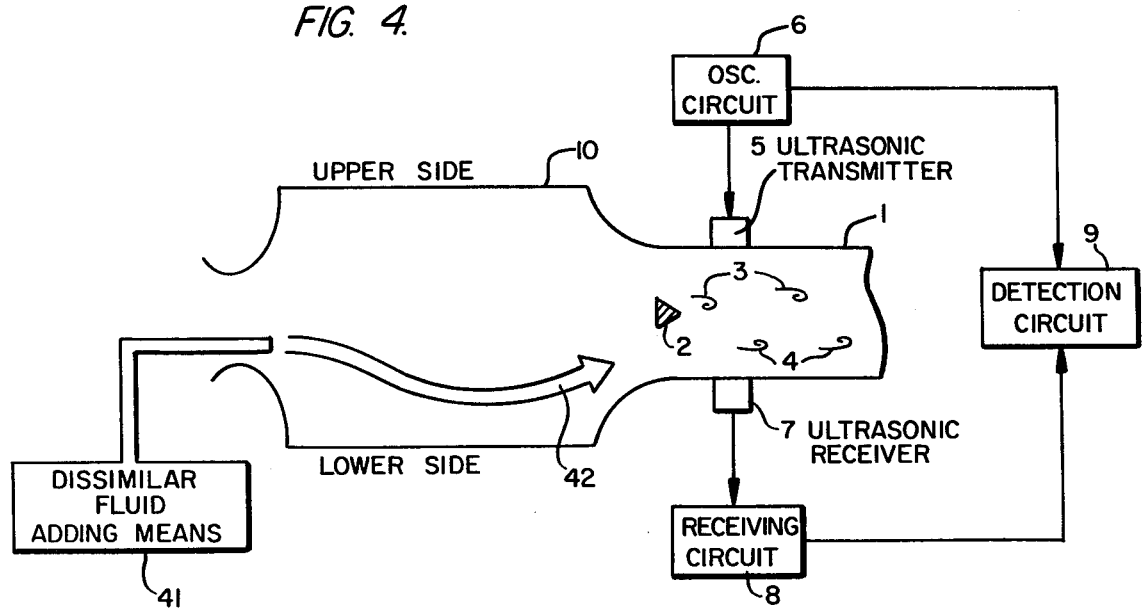

The present invention provides the ultrasonic transmitter 5 on the upper side of the vortex generating strut 2 and the receiver 7 on the lower side thereof and utilizes the convection of fluids to produce a temperature difference between the upper and lower sides of the strut 2. Only this construction exhibits the desired effect sufficiently. However if the effect of the convection of fluids is more positively created then the effect can be further improved. FIG. 2 is a view illustrating another embodiment of the present invention. In the figure, an electric heater 21 powered by an electric source 22 heats the drawn in fluid. This is different from FIG. 1 in that the fluid drawn in past the electric heater 21 is forcedly heated to produce uneveness in the temperature and thus to create positively the action of convection. The operation is otherwise substantially as described in conjunction with FIG. 1. By creating the convection in this way, the sensitivity of detection of vortices can be increased for low flow rates of steady-state fluids having no temperature difference. While an electric heater has been used as heating means in FIG. 2 a similar effect can also be achieved by using a cooler. By providing a means for adding a dissimilar fluid having a different specific gravity (density) at the position of the electric heater 21, a difference in sound velocity between the upper and lower sides of the fluid caused by that difference in density produces an effect substantially identical to that produced by temperature difference, and a similar result can be expected. FIG. 4 shows such a dissimilar fluid adding means 41 in place of the electric heater 21 included in the arrangement of FIG. 2. Where the dissimilar fluid is heavier than the fluid being measured, for example $CO_2$ where air is the fluid being measured, it passes through the lower portion of conduit as shown by the arrow 42 in FIG. 4. This mixed gas acts to make the density of that portion of the gas passing through the lower Kármán's vortex street 4 greater than that in the upper Kármán's vortex street 3. Thus a density difference is developed between the upper and lower Kármán's vortex streets 3 and 4 in which the vortices rotate in opposite directions to each other. Upon the development of this density difference, the ultrasonic wave propagated through the Kármán's vortex streets 3 and 4 has a modulated component caused by the density difference added to the propagation velocity as compared with the velocity in the absence of the density difference. Thereby a stronger vortex signal is detected. Thus the vortex signal can be stabilized at a low flow velocity. Clearly the reverse case can occur, namely where a fluid having less density than the fluid being measured is added. In such a case, the fluid being measured will flow as in FIG. 4 and the same effect will be achieved. Further where a fluid having an irregular temperature is to be measured, inaccurate measurements due to the irregular temperatures can be prevented from occurring by mixing such a different density fluid with the fluid being measured in an amount sufficient to cancel out the irregularity in the modulated component at the ultrasonic wave due to the irregular temperatures.

Figure 3:
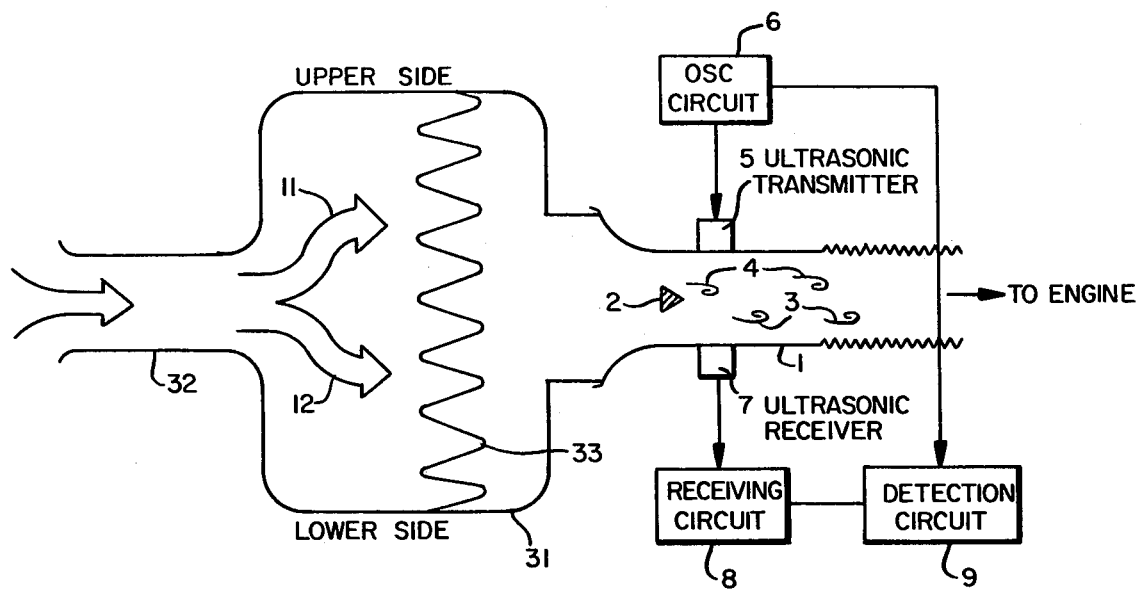

The embodiment as shown in FIG. 3 is used to measure the quantity of air drawn into an engine for a motor vehicle and in which there is a change in temperature or an uneveness of the temperature. In the figure, convection producing means is provided in the form of a case 3 for an air cleaner having an inlet 32 with a flow cross-section substantially smaller than that of the case 31 and a cleaner element 33 such as a filter paper. The flow cross-section of the case 31 is substantially larger than that of the conduit 1. The air drawn into the engine very frequently undergoes a temperature change or uneveness of temperature in the form of a transient change in temperature. Such air is drawn in through the inlet 32 and the flow speed upstream of the cleaner element 33 is reduced which effectively causes convection to produce a temperature difference between the upper and lower parts of the flow. Then it flows toward the upper and lower sides of the vortex generating strut 2. In such a case, an increase in the sensitivity of detection of vortices at low flow rates is achieved for the same reasons as described above. It is very effective for measuring the quantity of our drawn into engines of motor vehicles in which there is almost always an uneveness in the temperature.

In motor vehicles it is also possible to utilize heat from an engine and the temperature of cooling water which contributes to the uneveness of the temperature of effect the forced heating of the drawn in air to cause the temperature to be uneven. In the embodiment of FIG. 3 it is required only to dispose the portion of the inlet 32 for the air cleaner adjacent to an exhaust manifold or a radiator to effect the forced heating.

As described above, the present invention has been provided to facilitate the detection of the frequency of generation of vortices of a Kármán's vortex street at low flow speeds of a fluid to be measured without or with an uneveness of the temperature by producing a difference in propagation velocity of the fluid on opposite sides of a vortex generating strut with an extremely simple construction in which an ultrasonic transmitter and a receiver are disposed on the upper and lower sides respectively by the effective utilization of convection caused by a difference in temperature or density of the fluid. It provides Kármán's vortex street current meter having an excellent detecting ability even for low flow speeds and transient changes in temperature.

INDUSTRIAL APPLICABILITY

The present invention is not restricted to Kármán's vortex street current meters for measuring the flow speed or rate within conduits and is equally applicable, for example, to Kármán's vortex street current meters for measuring the quantity of air drawn into the engines of motor vehicles.

What is claimed is:

1. A Kármán's vortex street current meter comprising: a conduit having a vortex generating strut extending horizontally thereacross substantially perpendicular to the direction of flow of a stream of fluid through said conduit; convection producing means upstream of said strut for causing the less dense portion of the fluid flowing in the conduit to rise and flow along the upper part of the conduit and the more dense portion to flow along the lower part of the conduit and constituted by an introduction portion of said conduit disposed upstream of said vortex generating strut and sufficiently long for permitting convection in the fluid flowing in the conduit to cause the warmer portion of the fluid to rise and flow along the upper part of the conduit and the cooler portion to flow along the lower part of the conduit; means for changing the temperature of the fluid upstream of said introduction portion; and vortex detection means downstream of said strut and including an ultrasonic transmitter at the upper part of the conduit for propagating an ultrasonic wave across the Kármán's vortex street generated downstream of said generating strut, and an ultrasonic receiver positioned oppositely to said transmitter on the lower side of said conduit.

2. A Kármán's vortex street current meter according to claim 1 in which said temperature changing means comprises means for heating the fluid.

3. A Kármán's vortex street current meter according to claim 1 in which said temperature changing means comprises means for cooling the fluid upstream of said introduction portion.

4. A Kármán's vortex street current meter in which the fluid to be measured is air, and comprising: a conduit having a vortex generating strut extending horizontally thereacross substantially perpendicular to the direction of flow of a stream of fluid through said conduit; convection producing means upstream of said strut for causing the less dense portion of the fluid flowing in the conduit to rise and flow along the upper part of the conduit and the more dense portion to flow along the lower part of the conduit and constituted by an introduction portion of said conduit disposed upstream of said vortex generating strut and constituting an air filter casing with a flow cross-section substantially larger than said conduit and a filter element across said cross-section and an air inlet at the upstream end of said casing with a flow cross-section substantially smaller than the flow cross-section of said casing; and vortex detection means downstream of said strut and including an ultrasonic transmitter at the upper part of the conduit for propagating an ultrasonic wave across the Kármán's vortex street generated downstream of said generating strut, and an ultrasonic receiver positioned oppositely to said transmitter on the lower side of said conduit.

5. A Kármán's vortex street current meter comprising: a conduit having a vortex generating strut extending horizontally thereacross substantially perpendicular to the direction of flow of a stream of fluid through said conduit; convection producing means upstream of said strut for causing the less dense portion of the fluid flowing in the conduit to rise and flow along the upper part of the conduit and the more dense portion to flow along the lower part of the conduit and constituted by means for mixing a dissimilar fluid with fluid to be measured, whereby one of the fluids rises and flows along the top of the conduit and the other falls and flows along the bottom of the conduit; and vortex detection means downstream of said strut and including an ultrasonic transmitter at the upper part of the conduit for propagating an ultrasonic wave across the Kármán's vortex street generated downstream of said generating strut, and an ultrasonic receiver positioned oppositely to said transmitter on the lower side of said conduit.

* * * * *